United States Patent
Reeves et al.

(10) Patent No.: US 8,380,172 B1
(45) Date of Patent: Feb. 19, 2013

(54) ENHANCED SEARCH USER INTERFACE

(75) Inventors: Raymond E. Reeves, Olathe, KS (US); Ryan A. Wick, Apollo Beach, FL (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 211 days.

(21) Appl. No.: 12/874,151

(22) Filed: Sep. 1, 2010

(51) Int. Cl.
*H04L 12/58* (2006.01)
(52) U.S. Cl. ............ 455/412.1; 455/415; 455/466
(58) Field of Classification Search .......... 455/412.1, 455/412.2, 415, 466
See application file for complete search history.

(56) References Cited

U.S. PATENT DOCUMENTS

| | | |
|---|---|---|
| 2007/0173267 A1* | 7/2007 | Klassen et al. ............ 455/466 |
| 2009/0041217 A1 | 2/2009 | Balk et al. |
| 2009/0047934 A1* | 2/2009 | Wassingbo ............ 455/412.2 |
| 2011/0195691 A9* | 8/2011 | Maguire et al. ........... 455/412.1 |

* cited by examiner

*Primary Examiner* — Vladimir Magloire

(57) ABSTRACT

A method of communication is provided. The method comprises receiving a voice call and, based on receiving the voice call, accessing a plurality of stored messages transmitted by an originator of the voice call. The method further comprises presenting the identity of the originator of the voice call and at least part of one of the stored messages.

14 Claims, 6 Drawing Sheets

ENHANCED SEARCH USER INTERFACE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication over networks of specialized base stations known as cell towers or sites. In addition to the standard voice function of a mobile telephone, current mobile phones and other similar portable electronic devices may support additional services including short message service (SMS) for text messaging, electronic mail, and packet switching for access to the Internet. Other services include gaming, Bluetooth, infrared, camera with video recorder, multimedia messaging services (MMS) for sending and receiving photographs and downloading of video, MPEG-1 Audio Layer 3 (MP3) for audio storage, radio, and global positioning system services. Current mobile telephone and other portable electronic devices connect to cellular networks consisting of switching points and base stations owned by mobile network operators. Mobile phones, personal digital assistants (PDA), and other similar devices may also provide for memorandum and document recording, personal organizer and personal digital assistant functions, calendar and/or scheduling functions, and instant messaging services, and may serve as wireless modems for personal computers and as a console to online games.

SUMMARY

In an embodiment, a method of communication is disclosed. The method comprises receiving a voice call and, based on receiving the voice call, accessing a plurality of stored messages transmitted by an originator of the voice call. The method further comprises presenting the identity of the originator of the voice call and at least part of one of the stored messages.

In an embodiment, a method of communication is disclosed. The method comprises receiving a voice call and, based on a telephone number of an originator of the voice call, identifying the originator of the voice call. The method further comprises, based on the originator, accessing a first stored message transmitted by the originator, presenting at least a portion of the first stored message, receiving a selection of a text string, where the text string is part of the first stored message, based on the text string, filtering a plurality of messages, wherein the plurality of messages are not transmitted by the originator of the voice call, and presenting a list of the plurality of messages.

In an embodiment, a portable electronic device is disclosed. The device comprises a processor, a radio transceiver, a memory, a contact list stored in the memory and an application stored in the memory. When executed by the processor, the application, in response to the radio transceiver receiving a voice call origination message, identifies an originator of the voice call based on searching the contact list using a phone number of the calling party provided in the voice call origination message, searches for one or more stored messages transmitted by the originator of the voice call, and presents a first stored message transmitted by the originator of the voice call.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
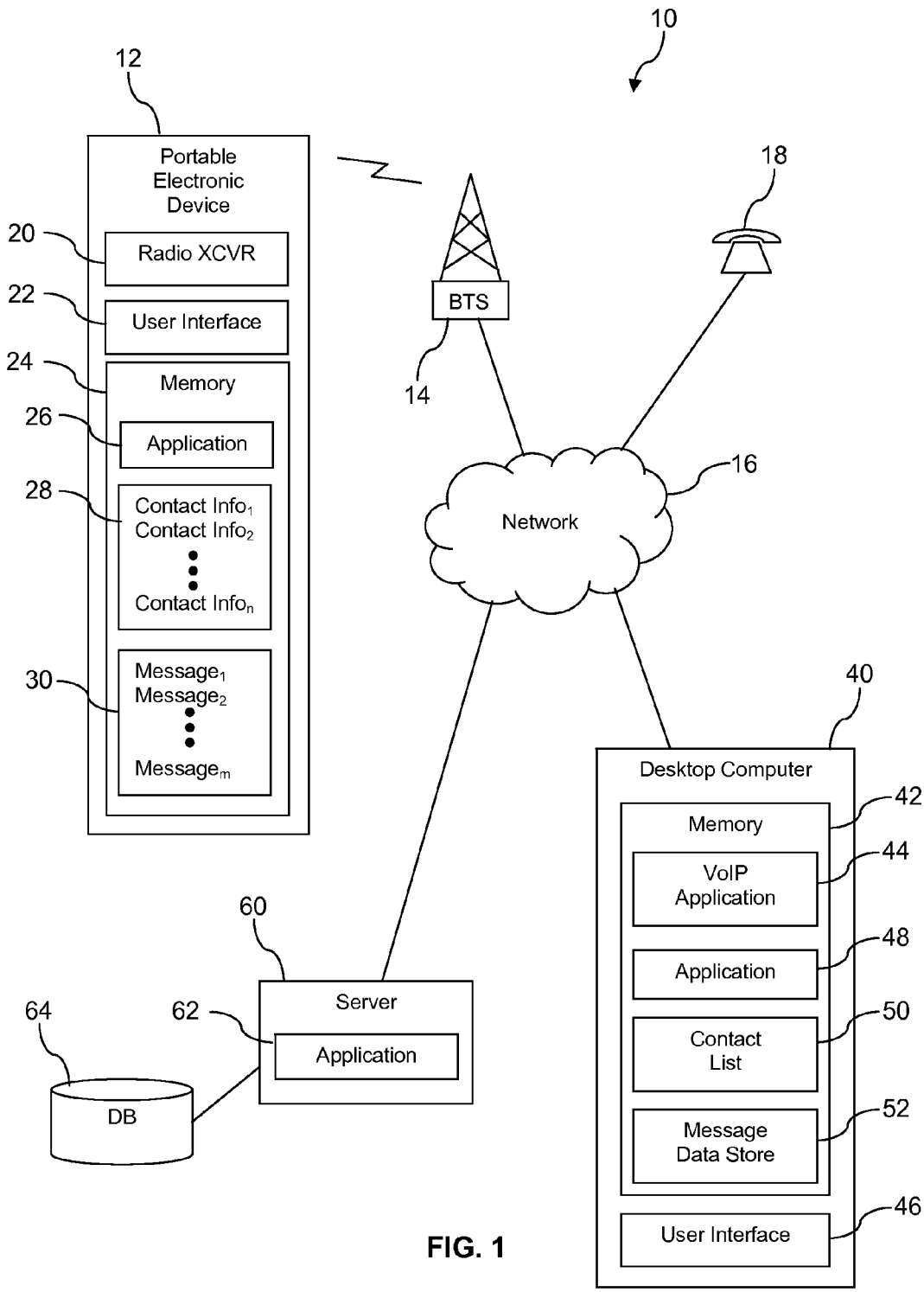
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An automated system for providing contextual information to a receiver of a telephone call is described. The context may be predicted or guessed based on an identity of the originator of the telephone call. Information associated with the originator may be located by searching a data store, and the information may be presented. For example, in response to an incoming telephone call to a mobile phone, an application executing on the mobile phone maps the telephone number of the originator of the call to an entry in a contact list stored on the mobile phone. The application searches for messages stored on the mobile phone or stored in a data store remote from the mobile phone, for example messages that were sent by the individual identified in the contact list entry, perhaps limiting the search based on time or based on another search constraint. The application may associate the originator of the telephone call with a group, for example an address book group. For example, an Enhanced Project Group may be defined in an address book to include Bob, John, and Sue as members. When the mobile phone receives an origination message from someone identified as a member of the group, the application may search for messages stored on the mobile phone or stored in a remote data store that are associated with the group or one of the members of the group. The messages that are found may be displayed as a list of topics, as a sequence of first sentences, or as full messages on the mobile phone.

The application may search a calendar application on the mobile phone for events or appointments associated with the originator of the telephone call or associated with a member of a group that includes the originator. The application may present one or more calendar events or appointments that are identified by this search.

The application may provide an interface that promotes selecting one of the messages from a displayed list of topics for presentation. The interface of the application may further promote designating a text string contained in a title, a first line, or a portion of a message. The application may then search for messages stored on the mobile phone or stored in a data store remote from the mobile phone that contain one or more words in the text string and present a list of the messages that meet this criterion. It is understood that the search using a text string as a search criterion need not be constrained by the telephone number and/or the identity of the originator of the call. The interface of the application may promote selecting one of these messages for presentation. Presentation of the messages, for example an email from a boss to a subordinate, may help the receiver of the phone call to rapidly establish context for the discussion with the calling party, for example rapidly coming up to speed on a task request sent by the boss to the subordinate two days ago.

The messages may be email messages, short message service (SMS) messages (also referred to as "text messages" in some contexts), multimedia message service (MMS) messages, or other message types. The application may execute on any device that is enabled for voice communications, for example a laptop computer enabled for voice communications by a voice over internet protocol (VoIP) application. In an embodiment, a thin client may execute on the mobile phone and the searches may be performed by an application executing on a server computer coupled to the mobile phone via communication links.

Turning now to FIG. 1, a communication system 10 is described. The system 10 comprises a portable electronic device 12, a base transceiver station (BTS) 14, a network 16, and a telephone 18. The portable electronic device 12 may be a mobile phone, a personal digital assistant (PDA), a media player, or other communication enabled portable electronic device. The base transceiver station 14 provides a communication link to the device 12 and couples the device 12 to the network 16. In an embodiment, the base transceiver station 14 provides a wireless communication link to the portable electronic device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of portable electronic devices 12.

The network 16 may be a public communication network, a private communication network, or a combination thereof. The network 16 may promote voice communications and/or data communications. The telephone 18 may be a desk phone, a mobile phone, or a phone application that executes on a computer.

The portable electronic device 12 may comprise a radio transceiver 20, a first user interface 22, and a first memory 24. Alternatively, the portable electronic device 12 may comprise two or more radio transceivers 20. The first memory 24 may store a first context application 26, a first contact list 28, and a first data store 30 comprising a plurality of stored messages. The first data store 30 may comprise messages received via the wireless link with the base transceiver station 14, for example short message service messages, multimedia message service messages, email messages, instant messages (IMs), and other electronic messages. Different types of messages may be stored in different portions of the first data store 30. For example, email messages may be stored in a portion of the first data store 30 allocated to an email application (not shown) that executes on the portable electronic device 12, and short message service messages (text messages) may be stored in another portion of the first data store 30 allocated to a short message service application (not shown) that executes on the portable electronic device 12. The first context application 26 may access the messages directly or may access the messages through an application programming interface (API) provided by the associated messaging applications. For example, the first context application 26 may access stored emails by invoking methods provided by an application programming interface of the email application.

Alternatively, different types of messages may be stored in the first data store 30. In an embodiment, the first data store 30 may be allocated for dedicated use by the first context application 26. For example, copies of email messages may be created in the first data store 30 separate from email messages that are stored in a portion of the memory 24 that is allocated for use by the email application and that is separate from the first data store 30. Likewise, copies of short message service messages may be created in the first data store 30 separate from short message service messages that are stored in another portion of the memory 24 that is allocated for use by the short messaging service application and that is separate from the first data store 30.

The first context application 26 is executed by a processor (not shown) of the device 12. When a voice call is originated by the telephone 18 directed to the portable electronic device 12, the radio transceiver 20 receives signaling associated with the origination of the voice call. In an embodiment, the radio transceiver 20 provides, or a processor coupled to the radio transceiver 20 provides, information about the signaling to the first context application 26, for example a telephone number of the voice call originator, for example the telephone number associated with the telephone 18. The portable electronic device 12 may connect the voice call immediately. Alternatively, in another embodiment, the portable electronic device 12 may connect the voice call after a delay, for example after presenting one or more messages for viewing by a user of the portable electronic device 12. The first user interface 22 may provide a control for selecting the voice call to be connected after having adequately established context.

In response to receiving the information about the signaling, the first context application 26 may search the first contact list 28 for an entry associated with the telephone number of the voice call originator, for example an address book entry. An entry in the first contact list 28 may comprise at least one of a work telephone number, a home telephone number, a mobile phone telephone number, an email address, a name, and other information. The first context application 26 may search the first data store 30 based on the entry to find messages sent to the device 12 by an electronic device associated with the entry. For example, the first context application 26 may search email messages received from an email address associated with the entry. As another example, the first context application 26 may search text messages received from a telephone number associated with the entry. Additionally, in an embodiment, the first context application 26 may also search a remote data store such as a data store coupled to an email server, for example, when the portable electronic device 12 has the capability of engaging in concurrent voice wireless communication and data wireless communication. In an embodiment, the portable electronic device 12 may comprise a plurality of radio transceivers 20, for example a first radio transceiver 20 promoting voice wireless communication and a second radio transceiver 20 promoting data wireless communication.

As a fuller example, the first application 26 may find an entry in the first contact list 28 for a John Doe that is associated with the telephone number of the voice call originator. The John Doe entry in the first contact list 28 may indicate an email address john.doe@domain.com, a mobile phone number, and other information. The first context application 26 may search the first data store 30 for text messages received from the mobile phone number listed in the John Doe entry in the first contact list 28. The first context application 26 may search the first data store 30 for email messages received from john.doe@domain.com email address.

In an embodiment, the first context application 26 presents the messages or the titles of the messages that have been found when searching the first data store 30 and/or a remote data store. The first context application 26 may also display the name of the originator of the voice call, for example John Doe. In some cases there may be no messages found and no message is displayed. In some cases, only a single message may be found, and this single message may be presented on a display of the first user interface 22. The single message may help a user of the portable electronic device 12 anticipate what the subject of the voice call may be about and may help the user rapidly construct a mental context of the call. Perhaps the single message is an email message sent by John Doe to ask that budget numbers associated with a new project be drawn together so a cost cutting meeting can be conducted. Perhaps the single message is a text message requesting that grocery items be picked up by a spouse on her way home from work.

In another case a plurality of messages may match one or more of the items of information contained in the entry in the first data store 30. In an embodiment, the first context application 26 may display a title of each of the messages. In an embodiment, the first context application 26 may display the first line of each of the messages. The first context application 26 may search the data store 30 and/or remote data store only for messages that are less than two days old, four days old, two weeks old, or some other duration limitation. The first context application 26 may provide only specified number of messages, for example only the three most recent messages or only the six most recent messages.

The first user interface 22 may promote selecting one of the messages for full display. The first user interface 22 may promote scrolling through lengthy messages. The first user interface 22 may provide a control for designating a text string that can be used as a search criterion to identify other messages stored in the data store 30 that may be useful for establishing a context of the voice call. For example, the text string "New Product Budget" may be designated, and the first data store 30 searched for messages containing the text string "New Product Budget" or sub-strings of "New Product Budget." Additional messages, perhaps not associated with the originator of the voice call, may be identified and presented as either in full display or as a list of titles or first lines of messages. The source of the messages may be displayed. The first user interface 22 may promote selecting a message for full display.

In an embodiment, the first context application 26 may present the messages, message titles, or message first lines before the voice call is connected. The portable electronic device 12 may return a distinctive tone or a voice message to the originator of the call that is played by the telephone 18 and indicates that the called party is establishing context preparatory to call connection. The distinctive tone may be a ringback tone. Alternatively, the portable electronic device 12 may send a message via the network 16 that invokes an auto redial function of the telephone 18 such that when the call context has been established by the first context application 26, for example when a control of the first user interface 22 is activated, the telephone 18 is triggered to auto redial to the portable electronic device 12. In an embodiment, the voice call may be connected while the first context application 26 is presenting messages, message titles, or message first lines. The called party may say something to the effect that he is consulting their message context and will be with the caller momentarily.

The present disclosure teaches that the above functionality can be provided using electronic platforms other than the portable electronic device 12. For example, a desktop computer 40 may comprise a second memory 42 and a second user interface 46. The second memory 42 may comprise a voice over internet protocol (VoIP) application 44, a second context application 48, a second contact list 50, and a second data store 52. The voice over internet protocol application 44 may execute on a processor (not shown) of the desktop computer 40. The telephone 18 may originate a voice over internet protocol voice call to the voice over internet protocol application 44, and the voice over internet protocol application 44 may provide information about the signaling to the second context application 48. The function of second context application 48 and its interactions with the second contact list 50, the second data store 52, and the second user interface 46 may be substantially similar to the corresponding function and interactions of the first context application 26. Computer systems are described in more detail hereinafter.

The present disclosure contemplates that some of the processing of the context applications 26, 48 may be performed by a third context application 62 executing on a server 60. The server 60 may be coupled to a data store 64 that may store the messages and the contact information. The portable electronic device 12 may receive signaling to connect a telephone call from the telephone 18 and send the information to the server 60 via the network 16. The third context application 62 may search and find messages as described above and send content for display by the portable electronic device 12. For example, the third context application 62 may format a hyper text markup language (HTML) file for transmitting to and display by the portable electronic device 12. When a control input is received from the first user interface 22, the portable electronic device 12 sends a message containing the control input selection to the server 60. The third context application 62 responds to the control input selection, and commands the server 60 to send a new hyper text markup language file to be transmitted to the portable electronic device 12. In this case, the first context application 26 may be a thin client that delegates the main processing, such as searching for messages that match a criterion, to the third context application 62.

Figure 2:
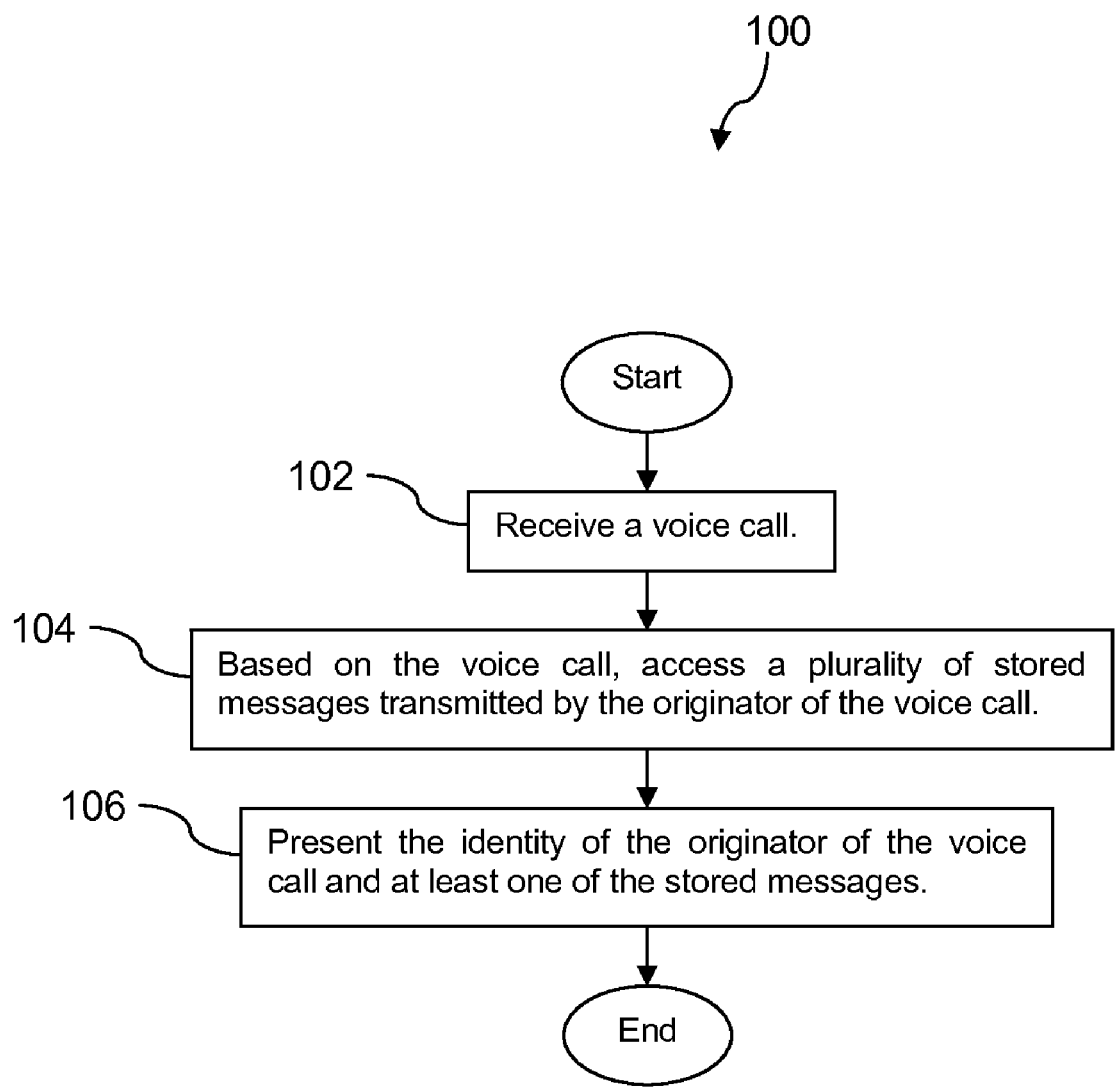
FIG. 2 is a flow chart of a method according to an embodiment of the disclosure.

Turning now to FIG. 2, a method 100 is described. At block 102 a voice call is received. For example, the portable electronic device 12 receives a voice call origination message. What is received, as is known to one skilled in the art, may be an origination message or a signaling message indicating that a call connection is requested. Different mechanisms and/or methods may be used to indicate a call connection request based on the voice communication technology used. At block 104, a plurality of stored messages that were transmitted by an originator of the voice call are accessed. The processing of block 104 may comprise identifying a telephone number associated with the originator of the call connection request. The processing of block 104 may further comprise searching a contact list, for example an electronic address book, for an entry associated with the telephone number. A list of stored messages, for example the first data store 30, may be searched using as a search criterion any of the telephone number, an email address, a name, or other information contained by the entry in the contact list associated with the telephone number.

In an embodiment, the processing of block 104 may further comprise accessing a calendar application and searching for an entry associated with the originator of the voice call, for example an appointment to meet with the originator of the voice call. The processing of block 104 may determine that the originator of the voice call is associated with a group, for example the Enhancement Project Group, comprising a plurality of members Bob, John, and Sue. The processing of block 104 may search for an entry in the calendar associated with the group and/or any member of the group. For example, a call from Bob may trigger searching the calendar for events and/or entries associated with Bob, John, Sue, or the Enhancement Project Group.

At block 106, the identity of the originator of the voice call and at least a portion or part of one stored message is presented, for example on a display of the portable electronic device 12. A calendar event and/or appointment associated with the originator of the voice call and/or associated with a group or a member of a group that the originator is a member of may also be presented. The voice call may be connected concurrently with the actions of block 104 and block 106. Alternatively, the voice call may be connected after the completion of the actions of block 106.

Figure 3:
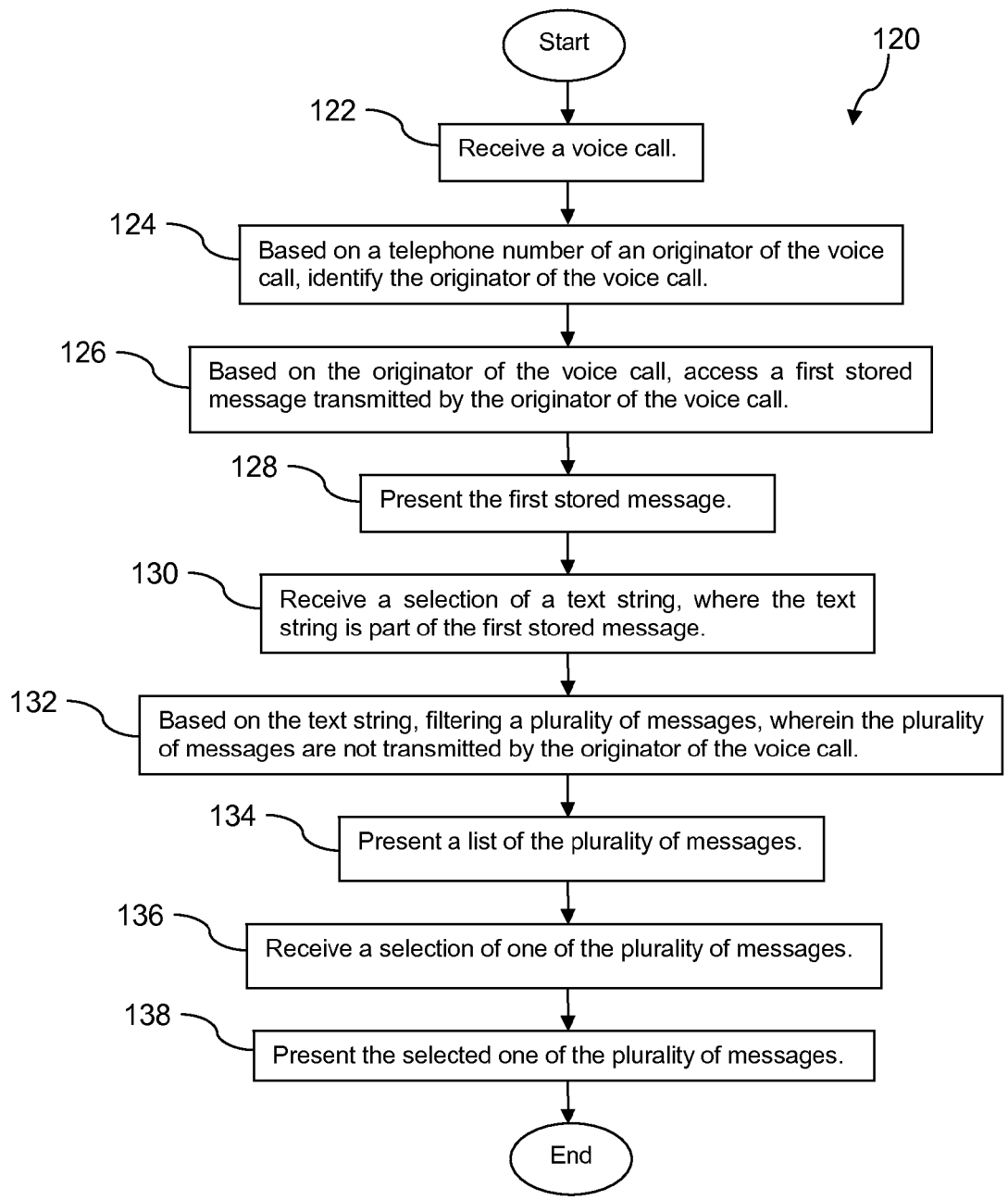
FIG. 3 is a flow chart of a method according to an embodiment of the disclosure.

Turning now to FIG. 3, a method 120 is described. At block 122, a voice call is received, for example one of a voice call origination message is received or voice call origination signaling is received. At block 124, based on a telephone number of an originator of the voice call, the originator of the voice call is identified. For example, the telephone number of the originator is used to search in an address book or in a list of contacts to find an entry comprising information associated with the originator. Alternatively, information provided in the voice call origination message, for example caller identification information, may be used to identify the originator of the voice call. At block 126, based on the originator or the identity of the originator of the voice call, a first stored message transmitted by the originator of the voice call is accessed. The first stored message may be any of an email message, a short message service message (text message), and a multimedia message service message. Accessing the first stored message may comprise searching a list of stored messages using one or more criteria. For example, the search may specify any message sent from a specific telephone number, a specific email address, or another identification. The criteria may further specify an age criteria, where messages more than two days old, more than four days old, more than two weeks old are not searched. Alternatively, the first context application 26 may filter messages based on aging. Additionally, the first context application 26 may select the three most recent messages, the six most recent messages, or some other number of most recent messages and disregard other messages. At block 128, the first stored message is presented.

At block 130, a selection of a text string is received, for example from the first user interface 22, where the text string is part of the first stored message. At block 132, a plurality of messages are filtered based on the text string. In an embodiment, the plurality of messages may not have been transmitted by the originator of the voice call. Alternatively, in an embodiment, at least one of the plurality of messages may have been transmitted by the originator of the voice call. In an embodiment, a plurality of messages may be filtered based on a group defined by an address book to comprise a plurality of individuals. For example, an address book may define an Enhancement Project Group to comprise Bob, John, and Sue. Messages may be filtered based on the Enhancement Project Group. When a call originated by Bob is received, the messages may be filtered based on the Enhancement Project Group and any message by Bob, John, or Sue may be selected by the filtering.

Filtering the messages may comprise searching the data store 30 using one or more search criteria to identify messages that are potentially of interest for establishing a context or supplementing the context of the voice call, for example to provide informational background that may promote the user of the portable electronic device 12 to participate more fully in the call and/or to discuss business matters or other matters better informed. These messages so identified may be referred to as filtered messages, messages that have passed through the filter implicitly defined by the selection criteria.

At block 134, a list of the plurality of messages is presented. The titles associated with the messages may be displayed in a list. The first line of the messages may be displayed in a list. At block 136, a selection of one of the plurality of messages is received, for example from the first user interface 22. At block 138, the selected message is displayed.

Figure 4:
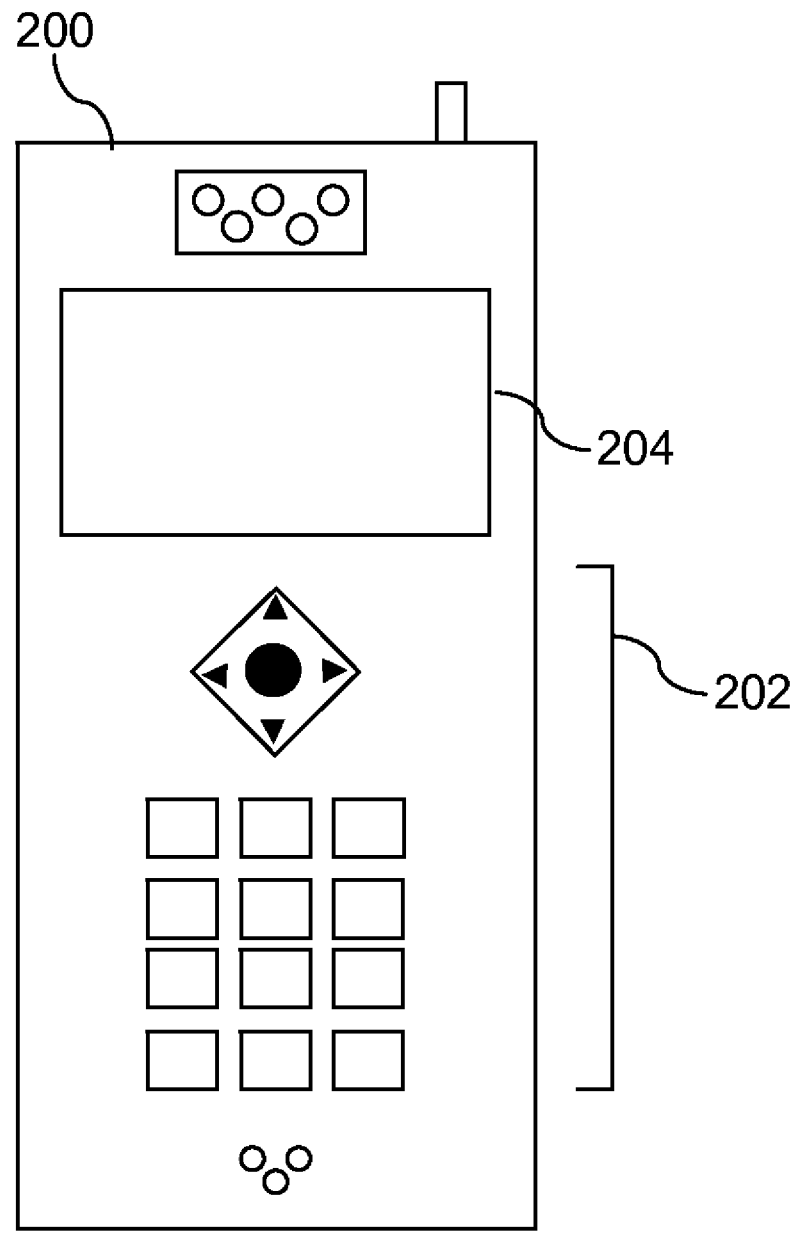
FIG. 4 is an illustration of a mobile device according to an embodiment of the disclosure.

FIG. 4 shows a mobile device 200. FIG. 4 depicts the mobile device 200, which is operable for implementing aspects of the present disclosure, for example the portable electronic device 12, but the present disclosure should not be limited to these implementations. Though illustrated as a mobile phone, the mobile device 200 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 200 is not a general purpose computing device like a portable, laptop or tablet computer, but rather is a special-purpose communications device such as a mobile phone, wireless handset, pager, or PDA. The mobile device 200 may support specialized activities such as gaming, inventory control, job control, and/or task management functions, and so on.

The mobile device 200 includes a display 204 and a touch-sensitive surface and/or keys 202 for input by a user. The mobile device 200 may present options for the user to select, controls for the user to actuate, and/or cursors or other indicators for the user to direct. The mobile device 200 may further accept data entry from the user, including numbers to dial or various parameter values for configuring the operation of the handset. The mobile device 200 may further execute one or more software or firmware applications in response to user commands. These applications may configure the mobile device 200 to perform various customized functions in response to user interaction. Additionally, the mobile device 200 may be programmed and/or configured over-the-air, for example from a wireless base station, a wireless access point, or a peer mobile device 200.

Figure 5:
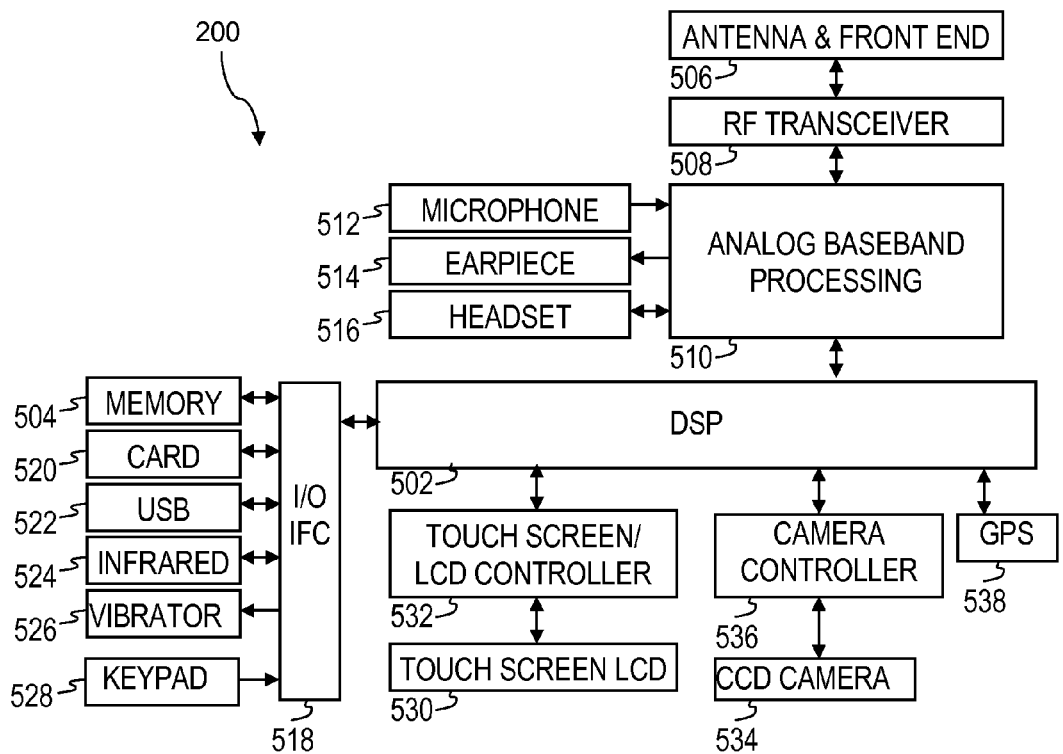
FIG. 5 is a block diagram of a mobile device according to an embodiment of the disclosure.

FIG. 5 shows a block diagram of the mobile device 200. While a variety of known components of handsets are depicted, in an embodiment a subset of the listed components and/or additional components not listed may be included in the mobile device 200. The mobile device 200 includes a digital signal processor (DSP) 502 and a memory 504. As shown, the mobile device 200 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 200 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 200 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 200 to send and receive information from a radio access network (RAN) or some other available wireless communications network or from a peer mobile device 200. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 200 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive email or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 200 to function as a peripheral device to exchange information with a personal computer or other computer system. The infrared port 524 and other optional ports such as a Bluetooth interface or an IEEE 802.11 compliant wireless interface may enable the mobile device 200 to communicate wirelessly with other nearby handsets and/or wireless base stations.

The input/output interface 518 may further connect the DSP 502 to the vibrator 526 that, when triggered, causes the mobile device 200 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 200. Another input mechanism may be the touch screen LCD 530, which may also display text and/or graphics to the user. The touch screen LCD controller 532 couples the DSP 502 to the touch screen LCD 530.

The CCD camera 534 enables the mobile device 200 to take digital pictures. The DSP 502 communicates with the CCD camera 534 via the camera controller 536. The GPS sensor 538 is coupled to the DSP 502 to decode global positioning system signals, thereby enabling the mobile device 200 to determine its position. In another embodiment, a camera operating according to a technology other than charge coupled device cameras may be employed. Various other peripherals may also be included to provide additional functions, e.g., radio and television reception.

Figure 6:
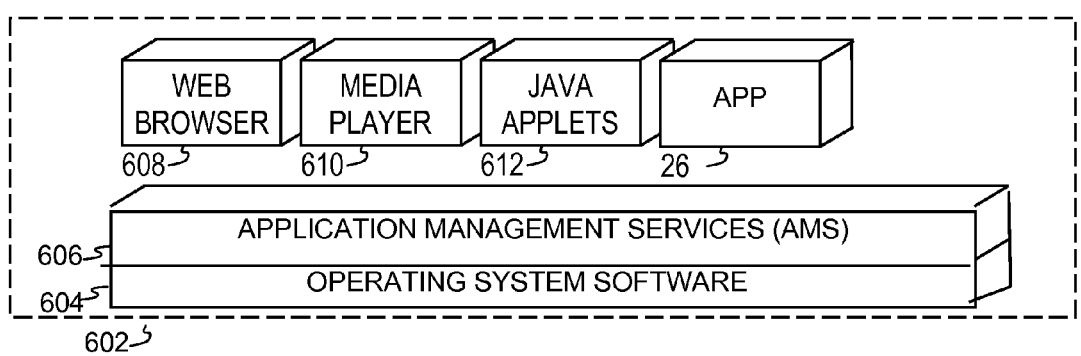
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 200. Also shown in FIG. 6 are a web browser application 608, a media player application 610, JAVA applets 612, and the first context application 26. The web browser application 608 configures the mobile device 200 to operate as a web browser, allowing a user to enter information into forms and select links to retrieve and view web pages. The media player application 610 configures the mobile device 200 to retrieve and play audio or audiovisual media. The JAVA applets 612 configure the mobile device 200 to provide games, utilities, and other functionality.

Figure 7:
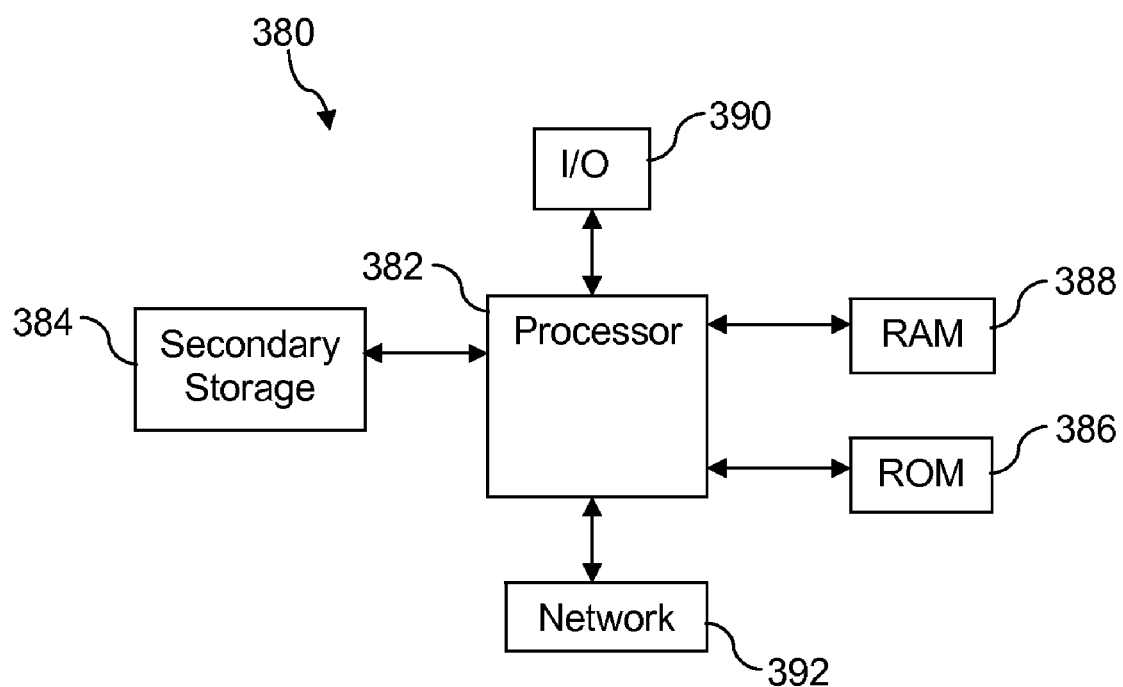
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as non-transitory storage and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communication, comprising:
   receiving a voice call;
   based on a telephone number of an originator of the voice call, identifying the originator of the voice call;
   based on the originator, accessing a stored message transmitted by the originator;
   presenting at least a portion of the stored message;
   receiving a selection of a text string from a user interface, where the text string is part of the stored message;
   based on the text string and regardless of the telephone number of the originator of the voice call or the originator of the voice call, searching a plurality of stored messages to identify messages of the plurality of stored messages that include one or more words in the text string, wherein at least some of the messages are not transmitted by the originator of the voice call; and
   presenting a list of the messages.

2. The method of claim 1, wherein accessing the stored message transmitted by the originator comprises accessing messages transmitted by the originator during a period of time extending from a current time to a period of time a predefined interval before the current time.

3. The method of claim 1, wherein the originator of the voice call is identified by matching the telephone number of the originator to a contact entry in an address book data store.

4. The method of claim 1, further comprising:
   based on the originator, determining a group identity;
   based on the group identity, accessing a stored message transmitted by a member of the group identity other than the originator; and
   presenting at least a portion of the stored message transmitted by a member of the group identity other than the originator.

5. A portable electronic device, comprising:
   a processor;
   a radio transceiver;
   a memory;
   a contact list stored in the memory; and an application stored in the memory that, when executed by the processor, in response to the radio transceiver receiving a voice call origination message, identifies an originator of the voice call based on searching the contact list using a phone number of the calling party provided in the voice call origination message, searches for one or more stored messages transmitted by the originator of the voice call, presents a first stored message transmitted by the originator of the voice call, receives an input selecting a text string from a user interface, where the text string is part of the first stored message, based on the text string and regardless of the telephone number of the calling party or the originator of the voice call, searches the memory to identify a second stored message that includes one or more words in the text string, and presents the second stored message, wherein the second stored message is a different type of message than the first stored message, and wherein the second stored message is not transmitted by the originator of the voice call.

6. The device of claim 5, wherein the portable electronic device is one of a mobile phone, a personal digital assistant (PDA), or a media player.

7. The device of claim 5, wherein the first stored message is one of an email message, a simple messaging service (SMS) message type, and a multimedia messaging service (MMS) message, and wherein the second stored message is one of an email message, a simple messaging service (SMS) message type, and a multimedia messaging service (MMS) message.

8. The device of claim 5, wherein the application searches the memory for one or more stored messages transmitted by the originator of the voice call.

9. The device of claim 5, wherein the application searches a data store remote from the device for one or more stored messages transmitted by the originator of the voice call.

10. The device of claim 5, wherein the application searching the memory for one or more stored messages comprises determining a phone number of the originator of the voice call, determining an identity of the originator of the voice call, and using the identity of the originator of the voice call to access at least one of the stored messages.

11. The device of claim 5, wherein the one or more stored messages comprise email messages.

12. The device of claim 11, wherein the one or more stored messages further comprise at least one of a short message service (SMS) message and a multimedia message service (MMS) message.

13. The device of claim 5, wherein the application further:
    determines a group identity based on the originator,
    accesses, based on the group identity, a third stored message transmitted by a member of the group identity other than the origination, and
    presents at least a portion of the third stored message.

14. The device of claim 13, wherein the application further, based on receiving the voice call, accesses a calendar application and presents at least one meeting appointment associated with at least one member of the group.

* * * * *